Figure 1:
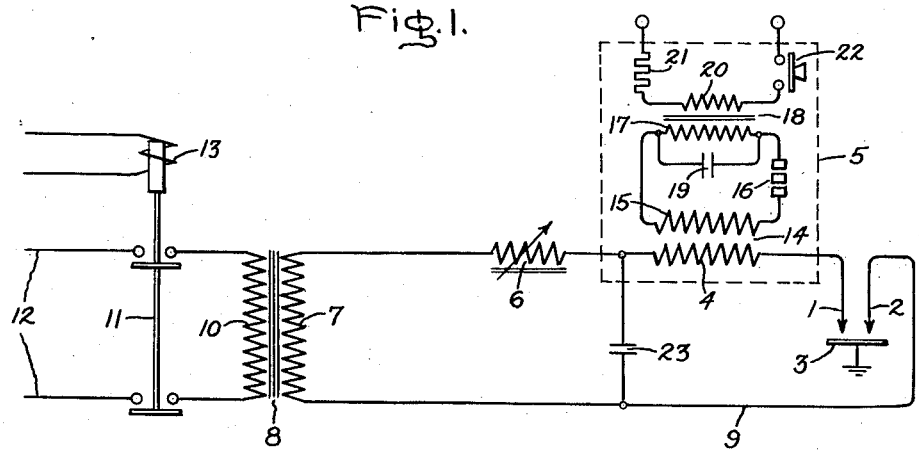

Inventor:
Everett F. Potter,
by
His Attorney.

Patented June 3, 1952

2,599,281

UNITED STATES PATENT OFFICE 2,599,281

ARC WELDING

Everett F. Potter, Schenectady, N. Y., assignor to General Electric Company, a corporation of New York Application December 23, 1949, Serial No. 134,711

3 Claims. (Cl. 219—8)

My invention relates to improvements in alternating current arc welding with arcs established between electrodes having substantially different electron emissivities at arcing temperatures. Such arcs interpose a greater resistance to current flow with one polarity of the electrodes than with the reverse polarity thereof. Consequently, alternating current circuits for energizing such arcs are traversed by a resultant direct current flow which is not only detrimental to the apparatus used for supplying such alternating current but also results in certain welding difficulties.

It is quite obvious that the resultant direct current flow in the alternating current circuit will produce saturation and heating effects in the apparatus employed for supplying the alternating current. It is less obvious, however, that this direct current flow will produce unsatisfactory welds but such is the case, and means have already been proposed for eliminating or reducing to a low value the direct current flow in such circuits.

The rectifier action of the arc above referred to is quite pronounced when the welding arc is established between a tungsten electrode and the work in an atmosphere of argon, helium or mixtures of these gases. When welding with such arcs the electron emissivities of the tungsten electrode is so much greater than that of the work parts that a substantial amount of direct current voltage is generated in the arc with a resultant flow of considerable direct current in the alternating current circuit. When welding certain metals this flow of direct current appears to have no detrimental effect on the weld in so far as coalescence of the fused metal is concerned. There are however, certain disadvantages which interfere with the welding operation. With an alternating current of unbalanced wave form such as results from the direct current component produced by the arc, it has been found that the weld metal has a tendency to pile up on one side of the weld producing undercutting on the other side of the weld, that filler wire melted off in the arc zone is not deposited uniformly but comes off in chunks, and that as much as 25% more gas is needed for suitably shielding the arc and the molten metal at the arc from the influence of the surrounding atmosphere. Furthermore, the direct current component will produce arc blow which is undesirable. Also, weld penetration when the direct current component is present in the arc is not as great as when this direct current component has been eliminated.

With certain metals such as aluminum and its alloys, it is absolutely necessary to reduce this direct current component to a very low value, preferably zero, in order to have the fused parts of the work flow together and form a satisfactory weld. Current flow from an aluminum work part to an inert gas shielded tungsten electrode produces or appears to produce an oxide film on the work which inhibits coalescence of the fused weld metal. This oxide film, however, is cleaned up when the electrode is positive and the work is negative. Consequently, when welding with alternating current if there is a sufficient current flow during half cycles when the electrode is positive, it is possible to make satisfactory welds in aluminum with the inert gas shielded tungsten arc above referred to.

It has already been proposed to reduce the direct current component of alternating current flow in an argon shielded arc established between a tungsten electrode and the work by using open circuit alternating current voltages greater than 145 volts and preferably greater than 200 volts. Like results with such an arc in a helium shielding atmosphere may be obtained by using alternating current whose open circuit voltage is greater than 280 volts and preferably greater than 380 volts. This method of operation has been described and claimed in the U. S. Letters Patent 2,474,023 Richard F. Wyer, June 21, 1949, for Method of Gas-Shielded Alternating Current Arc Welding. Furthermore, when using low voltage sources of commercial frequency and voltages less than those referred to above, it is possible to weld with such inert arcs if superimposed high frequency of sufficiently high voltage is used for initiating current flow through the arc during each half cycle of the alternating current power source. The resulting current flow will be unbalanced however and productive of the undesirable results above considered.

The use of high voltage alternating current sources of commercial frequency is inherently dangerous to the welding operator and the use of superimposed high frequency is furthermore undesirable because of its radio interference. It is possible however to use lower open circuit voltages for supplying power to the welding arc if the direct current component is reduced to zero or a very low value by introducing into the welding circuit suitable biasing means for accomplishing this result. Such arrangements have been disclosed and claimed in U. S. Letters Patent 2,472,323 Allanson U. Welch, Jr., June 7, 1949, for Arc Welding. The arrangement most commonly used in accordance with the teachings of this Welch patent is a series connected capacitor which blocks direct current flow but readily passes the alternating current to the welding arc. In view of the magnitude of the currents employed in welding, such series capacitors are of necessity quite large and expensive and add greatly to the size and weight of the welding transformer with which these are usually associated.

It is an object of my invention to eliminate the direct current component of current flow resulting from the use of an alternating current welding arc established between electrodes of substantially different electron emissivities by connecting two such arcs in series with one another so that the rectifier action of one arc is balanced against the rectifier action of the other arc. These arcs may both be used for welding or the welding action may be limited only to one arc. There are, however, so many applications where a plurality of arcs may be employed on the work parts at the same time that my invention will find its greatest applicability in simultaneously performing a plurality of welding operations on the same or different work parts.

The novel features which I believe to be characteristic of my invention are set forth with particularity in the appended claims. The invention itself together with further objects and advantages thereof can best be understood by reference to the following description taken in connection with the accompanying drawing in which Fig. 1 shows one form of apparatus for welding in accordance with my invention and Fig. 2 shows one form of arc welding agency which produces with alternating current the undesired direct current flow which is eliminated from the welding circuit by using my invention.

Figure 2:
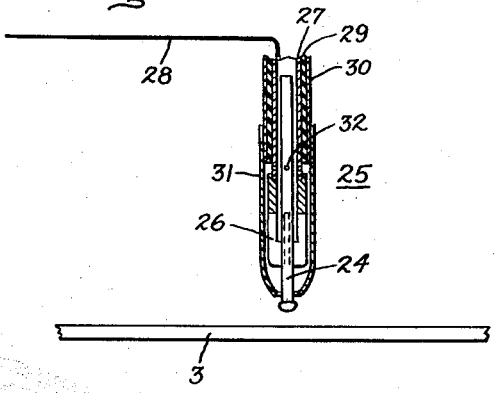

In the alternating current welding circuit shown in Fig. 1 of the drawing, a pair of series connected arcs are established between electrodes 1 and 2 and the work 3. These electrodes 1 and 2 inherently have, or under imposed operating conditions have at arcing temperatures substantially the same electron emissivities relative to one another which electron emissivities are however either substantially greater or substantially less than the electron emissivity of the work between which and the electrodes arcs are established by the alternating current supplied thereto. Electrode 1 is connected through the secondary transformer winding 4 of a high frequency high voltage generator 5 and an adjustable current controlling reactor 6 to one terminal of the secondary 7 of a welding transformer 8. The other electrode 2 is connected through conductor 9 to the other terminal of the secondary 7 of the welding transformer 8. The welding circuit is completed between the electrodes 1 and 2 through the work or work parts 3 which as illustrated in the drawing may be connected to ground. The primary 10 of the welding transformer is connected to a source of alternating current supply 12 through the switch members of a contactor 11 having an operating winding 13 whose energization may be controlled by the welding operator to connect and disconnect the welding transformer from the source of supply.

With the arrangement illustrated it will be noted that one of the electrodes is connected to one terminal of the alternating current source of supply and that the other electrode is connected to the other terminal of the alternating current source of supply so that when one electrode is of one polarity the other electrode is of the opposite polarity. If the electrodes 1 and 2 are the tungsten electrodes of gas-arc torches by means of which argon, helium, or mixtures thereof are supplied about the arcs and the molten portions of the metal in the work 3 and if the work 3 is of aluminum or an alloy thereof, it will be found that the arcing characteristics are such that current flows more readily from the work to the electrodes when they are of negative polarity and acting as cathodes. Otherwise stated, each welding arc between the electrodes 1 and 2 and the work 3 is of lower electrical resistance when the electrode is of negative polarity than when it is of positive polarity. If a single such welding arc were employed in the alternating current circuit above described, there would be a resultant direct current flow in the alternating current circuit which would be from the work to the electrode and an unbalanced wave of welding current would flow through the arc and the welding circuit. This unbalanced flow of alternating current would produce saturation and overheating of the welding transformer and would produce undesirable welding conditions most of which have been above recited and need not be repeated here. By series connecting the arcs between electrodes 1 and 2 and the work 3 in the manner illustrated in the drawing, it will be noted that when the resistance to current flow in one arc is high, the resistance to current flow in the other arc is low and vice versa, so that the resultant electric resistance of the welding circuit is uniform and there is consequently no tendency for the generation of a direct current voltage at the arcs which will be productive of the undesired direct current flow in the alternating current welding circuit.

In order to balance out completely the rectifying characteristic of one arc against that of the other arc it is necessary that these arcs be of substantially the same characteristics. This means that the electrodes must be of substantially the same material and size and operate under substantially the same conditions as to current density, heating, etc., so that their rectifying characteristics are the same or substantially so. Furthermore, means must be provided so that both of the arcs are established at the same time and so that if one of the arcs becomes extinguished the other arc must also become extinguished. This latter condition may be imposed by spacing the electrodes 1 and 2 from the work at a fixed distance equal to the arc gap desired for the welding arcs being employed. Consequently, if one of the arcs becomes extinguished, their series connection will automatically insure that both arcs are extinguished. Various means may be employed for positioning these electrodes in the manner above specified and since the consumption of the tungsten electrode in a shielding gas of argon or helium is very gradual, the arrangement may or may not embody some means for manually or automatically adjusting the electrodes during the welding operation although most welding operations may be performed with the initial adjustment of the electrodes which from time to time may be spaced from the work as desired before beginning a new welding operation.

With the electrodes spaced from the work as specified some means must be provided for simultaneously starting the arcs. This, in the arrangement illustrated, I have accomplished by means of the high frequency generator 5 previously referred to as having a secondary transformer winding 4 connected in series circuit with the arcs and the source of low frequency power current supplied to the arcs by the welding transformer 8. The secondary winding 4 is part of a high frequency transformer 14 having a primary winding 15 which is connected through a spark gap 16 to the secondary 17 of the input transformer 18. A capacitor 19 is connected in shunt to the secondary 17 of transformer 18 and forms part of the oscillating circuit. The primary 20 of transformer 18 is connected to a source of low voltage of commercial frequency through a current limiting resistor 21 and a push button switch 22. When the push button switch 22 is closed to start the arcs, high voltage high frequency current is supplied across the arc gaps between electrodes 1 and 2 and the work 3, the circuit being completed through a bypass capacitor 23. Once the arc gaps have been broken down by the high frequency current the power circuit for the arcs is completed and they may be thereafter fed with welding current from the low frequency power transformer 8 without employing the high frequency circuit again until it is desired to initiate another welding operation.

Although not limited thereto, each of the electrodes 1 and 2 may be the electrode 24 of a gas-arc torch having the structure illustrated in Fig. 2. This electrode 24 is of tungsten and is held in the torch 25 by the jaws of a spring collet 26 which is attached to the end of an electrically conductive gas tube 27 which in turn is connected to one of the welding circuit conductors 28. This tube 27 also constitutes a means for supplying a gas such as argon or helium about the arcing terminal of the electrode 24 and the molten portions of the work opposite thereto. To prevent short circuits and protect the welding operator from shocks this tube may be electrically insulated by a sleeve of insulation 29 which in turn is covered by a wear resisting metallic sleeve 30. A nozzle 31 is supported by frictional engagement with the end of sleeve 30 and is thereby insulated from the current carrying parts of the torch. This nozzle provides a chamber enclosing the end of tube 27 and the electrode holding collet 26 mounted thereon. Gas supplied through tube 27 flows into this chamber through a plurality of openings 32 in the side wall of tube 27. This gas is discharged from the tip of the nozzle 31 about the arcing terminal of the electrode 24 onto and about the portions of the work rendered molten by the arc established at the tip of the electrode. A gas-arc torch of the construction illustrated is frequently referred to as an inert-arc torch.

As previously described two torches such as illustrated in Fig. 2, each having substantially the same physical proportions and each operating with substantially the same adjustments so that their arcs have substantially the same operating characteristics, are provided in the alternating current welding circuit of Fig. 1. These torches may be positioned over the same work part 3 as illustrated in Fig. 1 or over a plurality of work parts which are electrically connected in series with one another to complete the arcing circuit between the electrodes 1 and 2. There are many arrangements where two arcs may be employed at the same time such as, for example, when welding spaced portions of the same seam, welding two circumferential or rectilinear seams spaced from one another and included in the same work assembly or in other such arrangements as will read-ily occur to those skilled in the art. Where the weld is to be reinforced, filler metal may be added to one or both of the arcs and the arcs may be arranged in tandem on the same seam slightly spaced from one another in order to build up a deposit as required when filling the welding groove between parts of substantial thickness.

My invention is not limited to the employment of gas-arc torches such as illustrated in Fig. 2 or to the welding of aluminum parts with such torches since the rectifying characteristics of arcs of the type considered are not limited to gas-arc torches and when such gas-arc torches are employed for welding metals other than aluminum and its alloys there is a decided rectifying action which however with certain metals is not as detrimental as when welding aluminum and its alloys.

By balancing the rectifying action of one arc established between electrodes having substantially different electron emissivities at temperatures produced by the welding arc established therebetween, with the rectifying action of another arc of the same characteristics and by providing means for starting these arcs simultaneously and maintaining both of such arcs so long as either is in operation, it is possible to eliminate completely the undesired direct current component of current flow in the alternating current circuit employed for energizing these arcs. This also improves welding conditions and when welding aluminum and its alloys is required to produce welds of satisfactory equality.

Other arc striking means than that illustrated may be employed for simultaneously initiating both arcs. The only requirement for the best operating characteristics is that both arcs be started at the same time and that both arcs be extinguished at the same time. The latter requirement follows automatically by reason of their series connections if suitable means are provided for simultaneously starting these arcs.

Various arrangements employing my invention as to method or apparatus will occur to those skilled in the art, and I consequently aim to cover by the appended claims all such modifications and adaptations of my invention as fall within the true spirit and scope thereof.

What I claim as new and desire to secure by Letters Patent of the United States is:

1. In an alternating current circuit including a pair of electrodes having substantially different electron emissivities at the temperatures produced by an arc established therebetween whereby said circuit including said arc has a greater resistance to current flow when one of said electrodes is of one polarity than when it is of the opposite polarity, the method of preventing direct current flow in said alternating current circuit which comprises providing an additional pair of electrodes of the same arcing characteristics as the electrodes of said arc, connecting said electrodes and the electrodes of said arc in series circuit with one another with like electrodes for both of said arcs connected to terminals of said source of alternating current which are of opposite polarity, simultaneously establishing arcs between both of said pairs of electrodes, and maintaining both of said arcs so long as either of them is in operation whereby the combined electric resistance characteristics of said arcs is substantially the same during half cycles of opposite polarity and a resultant direct current flow in said alternating current circuit is thereby prevented.

2. The method of arc welding work parts of aluminum and its alloys which comprises connecting a tungsten electrode to one terminal of an alternating current source of supply, connecting another tungsten electrode having the same physical characteristics as said first tungsten electrode to the other terminal of said source of alternating current supply, simultaneously establishing an arc between each of said electrodes and work parts of said aluminum and its alloys having the same arcing characteristics with tungsten to produce molten pools of metal in said work parts opposite each of said electrodes, supplying about the arcing terminals of said electrodes and the molten metal produced thereby at substantially the same rate and under substantially the same conditions the same shielding gas selected from the group consisting of argon and helium, and maintaining said arcs at substantially the same length so long as either of them is in operation whereby the rectifying characteristics of said arcs are opposed to one another and a direct current component of current flow in said alternating current circuit is prevented.

3. Arc welding apparatus comprising a pair of alternating current conductors having opposite polarities when energized from a source of alternating current, electrodes having at arcing temperatures the same but substantially different electron emissivities than the work to be welded so that the arc established between each of said electrodes and the work has a greater electric resistance to current flow with one electrode polarity than with the reverse electrode polarity, means for connecting one of said electrodes to one of said alternating current conductors and the other of said electrodes to the other of said alternating current conductors, the circuit between said electrodes being completed through work parts positioned opposite said electrodes, means for positioning said electrodes at substantially the same arcing distance from the work, and means for simultaneously establishing arcs between each of said electrodes and the work to produce zones of fusion in the work opposite each of said electrodes.

EVERETT F. POTTER.

REFERENCES CITED

The following references are of record in the file of this patent:

UNITED STATES PATENTS

| Number | Name | Date |
| --- | --- | --- |
| 1,300,117 | Caldwell | Apr. 8, 1919 |
| 1,371,094 | Holslag | Mar. 8, 1921 |
| 2,401,722 | Clapp et al. | June 11, 1946 |
| 2,460,990 | Kratz et al. | Feb. 8, 1949 |
| 2,472,323 | Welch | June 7, 1949 |
| 2,474,023 | Wyer | June 21, 1949 |